(12) United States Patent
Clamp (10) Patent No.: US 7,717,563 B2
(45) Date of Patent: May 18, 2010

(54) CONTACT LENSES

(75) Inventor: John Clamp, Cambridge (GB)

(73) Assignee: Contact Lens Precision Laboratories Limited (GB)

( * ) Notice: Subject to any disclaimer, the term of this patent is extended or adjusted under 35 U.S.C. 154(b) by 402 days.

(21) Appl. No.: 11/667,976

(22) PCT Filed: May 22, 2006

(86) PCT No.: PCT/GB2006/001862

§ 371 (c)(1),
(2), (4) Date: May 16, 2007

(87) PCT Pub. No.: WO2006/129062

PCT Pub. Date: Dec. 7, 2006

(65) Prior Publication Data

US 2008/0055545 A1 Mar. 6, 2008

(30) Foreign Application Priority Data

Jun. 3, 2005 (GB) .................................. 0511288.3

(51) Int. Cl.
*A61B 3/00* (2006.01)
*A61B 3/14* (2006.01)
*G02C 7/04* (2006.01)

(52) U.S. Cl. .................... 351/247; 351/208; 351/160 R; 351/219

(58) Field of Classification Search ......... 351/246–247, 351/200, 205, 219, 160 R, 159, 206, 208, 351/212

See application file for complete search history.

(56) References Cited

U.S. PATENT DOCUMENTS 5,009,497 A * 4/1991 Cohen ........................ 351/161
5,114,628 A 5/1992 Hofer (Continued)

FOREIGN PATENT DOCUMENTS

GB 2398886 A 9/2004

(Continued)

*Primary Examiner*—Scott J Sugarman
*Assistant Examiner*—Dawayne A Pinkney
(74) *Attorney, Agent, or Firm*—Barnes & Thornburg LLP (57) ABSTRACT

Disclosed is a method of designing a soft contact lens, the method comprising the steps of: (a) measuring or defining a wavefront generated by passage of light through a selected eye and using the wavefront to generate a computer model of the optical characteristics of the selected eye; (b) measuring or defining the topography of the cornea of the selected eye; (c) incorporating into the computer model a soft contact lens, the posterior surface topography of which is defined by the topography of the cornea, offset by an arbitrary amount intended to represent the tear layer thickness of the selected eye, said lens having a defined thickness at a selected locus on the anterior surface; (d) calculating a desired topography for the anterior surface of the lens such that the wavefront will be corrected to assume a desired pattern (for example, preferably planar, the plane of which is perpendicular to the optical axis of the lens) when passing through the computer model eye/lens combination; (e) remodeling the lens off-eye by adapting the posterior topography of the lens to a desired posterior topography to be manufactured; and (f) recalculating a modified anterior topography required as a result of adapting the posterior topography, the modified anterior topography being intended to preserve the desired wavefront pattern defined in (d) when the lens is in situ on the selected eye.

13 Claims, 4 Drawing Sheets

U.S. PATENT DOCUMENTS 6,082,856 A 7/2000 Dunn
2006/0274261 A1* 12/2006 Andino et al. .............. 351/159

FOREIGN PATENT DOCUMENTS

| WO | WO 00/48036 A1 | 8/2000 |
| WO | WO 01/11418 A1 | 2/2001 |
| WO | WO 02/088830 A1 | 11/2002 |

* cited by examiner

CONTACT LENSES

FIELD OF THE INVENTION

The present invention generally relates to the use of a soft contact lens to correct ocular aberrations within a human eye. More specifically, the present invention defines a method of designing a soft contact lens to correct higher order aberrations of the eye.

BACKGROUND OF THE INVENTION

Conventional contact lenses are generally designed to improve the visual acuity of the human eye. The human eye frequently does not constitute a perfect optical system, but instead comprises optical imaging errors which are known as ocular aberrations. For many individuals, the most significant refractive errors giving rise to visual problems associated with the focal power of the eye are those caused by the so-called lowest order aberrations, namely defocus and astigmatism. However, a large number of people have normal retinal function and clear ocular media, but cannot attain good visual acuity using conventional contact lenses, due to having an irregular corneal surface or irregular crystalline lens which gives rise to higher order or irregular aberrations.

One such defect of the eye is known as spherical aberration, wherein light rays entering a refracting surface such as the cornea of the eye, or the lens, are less strongly focused at the centre of the cornea or lens and are progressively more strongly focused off-centre. This results in an image that is sub-optimal and is not clearly focused on one point, but on a series of focal points in front or behind the retina. UK Patent No. 2364138 relates to the design of contact lenses for reduction of spherical aberration. Lenses have also been developed to reduce the effect of tilt aberrations.

Several techniques have been used to measure the wavefront aberrations of the eye. One such technique involves the measurement of the ocular shape of a wavefront using a wavefront aberrometer. The wavefront aberrometer operates by focusing a fine beam of light through the eye. The beam is then scattered back by the retina, through the eye and the pupil. The resulting data is presented as a profile of the optical aberrations present in a subject's eye by means of an ocular optical wavefront. In this respect, the aberrations of the eye can be described as a defined wavefront, the shape of which represents the optical aberrations, a planar wavefront being produced by an ocular system with no net aberrations. The wavefront may be mathematically described using a number of functions, most commonly using a set of Zernike or Seidal functions.

The surface topography of the cornea of the eye is often not spherical. Instead the corneal topography may change at varying and unpredictable rates from the centre of the cornea out to the periphery in a manner that is unique to every individual cornea. Consequently, the optical function of a contact lens is affected by the topography of the cornea onto which the contact lens is superposed. In some cases, the uneven topography the cornea may affect the contact lens by creating a layer of lachrymal fluid (i.e. a lachrymal lens) between the posterior face of the contact lens and the surface of the cornea and/or by deforming the posterior (and consequently the anterior surface in the case of a soft lens) of the contact lens when the contact lens is superposed on the cornea of the eye.

U.S. Pat. No. 5,114,628 describes a method for the manufacture of contact lenses whilst taking into account the topography of the eye and compensating for the lachrymal lens by modifying the optical area of the front surface of the lens. The document does not disclose correction of higher order aberrations.

U.S. Pat. No. 6,086,204 describes a method to record the aberrations of the eye. In particular, the method involves the use of mathematical steps to design a contact lens wherein the aberrations have been significantly reduced. However, there is no reference in this patent to the feature wherein a soft contact lens is designed to take into account the topography of the cornea. The method disclosed in U.S. Pat. No. 6,086,204 requires the actual manufacture of an initial lens, with associated cost and effort of fitting, etc.

U.S. Pat. No. 6,305,802 describes a method of integrating the topography of the cornea and ocular wavefront data to create a soft lens design. The method involves the use of topographical data to create a soft contact lens design wherein the posterior surface of the lens is uniquely matched to the corneal topography. In addition, the unique posterior surface of the lens corrects for lower and higher order optical aberrations. The posterior surface of the contact lens is described as having an arbitrarily defined shape or an averaged shape based on the corneal topography, wherein any known aberrations are corrected on the anterior surface of the lens. This involves a process of using corneal topographic information to calculate the posterior surface of the lens, subtracting optical aberrations due to the posterior surface of the lens from the total optical aberrations, and using the net residual optical aberration to determine the anterior surface of the lens. However, there is no reference or guidance given as to the method of calculating the resulting ocular aberrations using the configuration of the posterior surface of the lens.

International Application No. PCT/US2003/027478 describes a method of using a real trial diagnostic lens in order to determine the ocular aberrations that arise from the combination of a soft contact lens with an arbitrarily defined posterior surface. The trial lens is also used to determine the position of the final lens in normal wear conditions. However, the use of such a trial lens increases the cost and time required for fitting contact lenses.

SUMMARY OF THE INVENTION

The present invention relates to a method of designing a soft contact lens using information relating to the corneal topography of the eye, the overall geometry of the eye and the optical aberrations present.

According to the present invention there is provided a method of designing a soft contact lens, the method comprising the steps of:

(a) measuring or defining a wavefront generated by passage of light through a selected eye and using the wavefront to generate a computer model of the optical characteristics of the selected eye;

(b) measuring or defining the topography of the cornea of the selected eye;

(c) incorporating into the computer model a soft contact lens, the posterior surface topography of which is defined by the topography of the cornea, offset by an arbitrary amount intended to represent the tear layer thickness of the selected eye, said lens having a defined thickness at a selected locus on the anterior surface;

(d) calculating a desired topography for the anterior surface of the lens such that the wavefront will be corrected to assume a desired pattern (for example, preferably planar, the plane of which is perpendicular to the optical axis of the lens) when passing through the computer model eye/lens combination;

(e) remodelling the lens in isolation from the eye by adapting the posterior topography of the lens to a desired posterior topography to be manufactured; and (f) recalculating a modified anterior topography for the lens required as a result of adapting the posterior topography, the modified anterior topography being intended to preserve the desired wavefront pattern defined in (d) when the lens is in situ on the selected eye.

Typically, steps (e) and (f) are performed substantially simultaneously by dividing the lens into a plurality of notional elements, each element being moved towards or away from the posterior surface as appropriate so as to arrive at the desired posterior topography and simultaneously modifying the anterior surface topography.

In one embodiment, the lens is made according to a given posterior surface topography and the calculated anterior surface topography.

When positioned on the cornea of the eye, the soft contact lens generally conforms to the anterior surface of the cornea. The posterior surface of the contact lens is positioned on the anterior surface of the cornea. The anterior surface of the contact lens is the surface further from the cornea when the lens is worn.

The soft contact lens is typically divided into a plurality of zones, each zone having different optical powers. Preferably, the contact lens comprises a central optical zone and a peripheral non-optical zone. The optical zone is that part of the lens which in use overlies the pupil and is therefore responsible for the correction of the optical aberrations in the eye. Typically, the optical zone is 8 mm in diameter, although it can vary up to a value of approximately 10 mm in diameter. The peripheral zone is that part of the lens that lies outside the optical zone. The peripheral zone will typically comprise one or more features (e.g. prisms or wedges) which confer rotational and/or translational stability to the lens.

The posterior and anterior surface topography of the lens are preferably designed according to the method over at least the entire optical zone. The posterior surface topography is preferably defined according to the method over substantially the entire posterior surface of the lens (i.e. including the peripheral zone).

In one embodiment of the present invention, step (a) is carried out using a wavefront aberrometer. The data generated is represented using a set of Zernike coefficients relating to Zernike polynomial descriptions of wavefront geometrical forms. The wavefront may alternatively be represented using any other suitable mathematical method, such as discrete point file definitions, Bezier surface patch definitions, or other two-dimensional or three-dimensional line or surface definitions.

In a preferred embodiment of the present invention, step (b) is performed using a corneal topographer. The topography of the cornea may be represented in a number of different ways, the preferred method being a discrete point file map.

Typically, the overall geometry of the eye and eye lids are assessed in order to record the horizontal diameter of the iris and the position of the top and bottom eye lid with respect to the iris, measured during normal straight line gaze.

Preferably, a three-dimensional computer model of the eye (including a cornea, a crystalline lens and a retina) is created in accordance with step (c) of the present invention. The computer model is optically based on the aberration data and the corneal topography of a selected eye. The "selected eye" may be that of an actual individual, the aberration data and corneal topography being personalised and specific to that particular individual. Alternatively, the aberration data and/or corneal topographies may be based on measurements taken from a plurality of individuals, for example, a population mean value. In this latter instance, the "selected eye" is a statistical representation or artefact, and does not necessarily correspond to any one individual's eye. A soft contact lens is represented on the cornea of the computer model; the posterior surface of the lens being determined by the corneal topography of the lens, but offset from the cornea by a distance which is determined by an arbitrary tear layer thickness.

In accordance with step (d) of the present invention, the anterior surface of the lens may be determined using mathematical techniques such as optical path lengths, ray tracing or other techniques, in order to make any desired correction to optical aberrations in the eye. An initial point is selected on the anterior surface of the lens, which is a desired distance from the posterior surface, corresponding to the thickness of the lens at that point. Preferably, but not necessarily, the selected initial point may be on the optical axis of the lens. In this instance, at the selected initial point, the anterior surface of the lens will be perpendicular to the optical axis. A series of points along the wavefront are then selected, each being an incremental distance along the posterior surface of the lens from the selected initial point on the anterior surface (e.g. at increasing displacement from the optical axis). Light rays passing through the selected series of points are then modelled, allowing for refraction at the posterior surface of the lens, so as to determine the necessary shape of the anterior surface to cause the rays to emerge from the lens/eye system in a desired wavefront pattern, which will preferably be planar and perpendicular to the optical axis. Typically, the process is reiterated for a plurality of radii or paths across the lens.

In a preferred embodiment of the present invention, once the anterior surface has been defined, the thickness of the lens is ascertained (as determined by the applied anterior surface shape) at incremental points along each of the measured radii or paths of the soft contact lens representation. This is to ensure that the thickness of the lens does not fall below a minimum value. If the thickness of the lens falls below the set minimum value then the preceding step is repeated using an initial point with a greater separation from the posterior surface of the lens so as to increase the lens thickness. Preferably, each measured path of the contact lens is linear or radial in nature.

In accordance with step (e) of the present invention, once the posterior and anterior surfaces of the contact lens have been defined in situ on the computer model, the soft contact lens representation is removed from the model eye and deformed in order that the posterior surface conforms to a desired surface. Typically, the desired posterior surface is simplified, relative to the corneal topography, so as to simplify the fitting and making of the contact lens. Typically, the desired posterior surface is a spherical surface with standard soft contact lens posterior surface dimensions. Preferably, the desired surface is a spherical surface that is flatter in radius than the best fit spherical approximation to the corneal topography in order to avoid a suction effect between the cornea and a tightly fitting lens.

Typically, in accordance with steps (e) and (f) of the present invention, the anterior surface is adjusted across each section or path of the soft contact lens by splitting each section or path into a plurality of notional elements, wherein the element boundaries are preferably deformed as being perpendicular to the centreline of the section or path. From an arbitrary start point, preferably at the optical axis of the soft contact lens, each element is moved in a direction perpendicular to the centreline of the section or path, in order to achieve the desired posterior surface and simultaneously modify the anterior surface topography. This process is repeated for each section or path of the soft contact lens representation.

In order to evaluate the optical performance of the represented soft contact lens, it is positioned on the cornea of the computer model at incremental translational and rotational offsets. The anterior surface of the lens is deformed in relation to the posterior surface and the theoretical total number of aberrations in the computer model are determined using mathematical techniques such as optical path lengths, ray tracing or other techniques. From the total number of aberrations, the performance of the represented soft contact lens may be reviewed using techniques known to those skilled in the art, such as optical transfer functions, point spread functions and representative retinal images.

Following evaluation, the peripheral non-optical areas of the posterior surface of the contact lens may also be defined.

In one embodiment of the present invention, the periphery of the anterior surface of the lens is designed to incorporate stabilising means. Preferably, the stabilising means include stabilising wedges to ensure that the lens does not rotate arbitrarily on the eye and some means to reduce translational movement of the lens. More preferably, the posterior surface is also configured to increase translational stability through the use of a spherical configuration that has a steeper radius than would normally by used when fitting a conventional soft contact lens.

In a preferred embodiment, the zonal junctions (e.g. the junctions between the optical and non-optical zones of the lens) of the lens are smoothed using geometrical techniques. In addition, the area around the stabilising wedges in the peripheral non-optical zone may be smoothed using the same techniques. Such treatment ensures that the contact lens can be manufactured using state-of-the-art equipment without the need to polish the lens after machining. Typically, the geometrical techniques used may include fillet radii, quadratic spline curves, cubic spline curves or other techniques designed to reduce the sharpness of the zonal junctions.

Preferably, the soft contact lens is designed in the soft hydrated state and is subsequently transformed into the dry dehydrated state through the use of a bulk transformation factor, that relates to the material properties of the lens, in a conventional manner known to those skilled in the art. The design of the soft contact lens in the dehydrated state is converted into a three-dimensional data set which is then used to manufacture the lens using contact lens production equipment. Typically, state-of-the-art lathing systems such as the (Precitech Optoform 80) are used in combination with (e.g. the FTS1000) oscillating tool technologies, wherein individual lenses are either manufactured in their entirety, or through the use of a hybrid system wherein the posterior of the lens is moulded and the anterior of the lens is machined.

Advantageously, the present invention avoids the requirement for a trial lens or any additional over-refraction measurement, hence reducing practitioner and patient fitting times.

In one embodiment the method of the invention can be used for the design of a soft contact lens suitable for large-scale production using information from population averaged corneal geometries, eye geometries and aberration data. Preferably, data is sampled for a defined segment of the population and is used in combination with the defined the input factors and the arbitrary defined posterior surface topography of the lens.

In a second aspect, the invention provides a contact lens made by the method of the first aspect.

BRIEF DESCRIPTION OF THE DRAWINGS

The invention is further described with reference to the following drawings, in which:

FIG. 3 shows an initial topographic state of the lens surfaces. FIG. 4 shows the topography of the lens surfaces once the position of the lens elements has been altered to achieve the desired posterior surface profile.

DETAILED DESCRIPTION OF THE INVENTION

There will now be described, by way of the following examples, methods in accordance with the present invention to determine the shape or optical characteristics of a soft contact lens.

EXAMPLE 1

The method of the present invention requires the determination of certain characteristics of a selected eye.

Firstly, the ocular performance of a selected eye is measured using a wavefront aberrometer, such as the Topcon KR-9000PW Wavefront analyser. The data generated is represented using a set of Zernike coefficients relating to Zernike polynomial descriptions of wavefront geometrical forms. Zernike coefficients are well known to those skilled in the art, and are frequently used to convey wavefront geometrical information. The wavefront may alternatively be represented using any other suitable mathematical method, such as discrete point file definitions, Bezier surface patch definitions, or other two-dimensional or three-dimensional line or surface definitions.

Secondly, the topography of the cornea of the selected eye is determined using a corneal topographer such as the EyeSys 2000 Corneal Analysis System. This system can represent the topography of the cornea in a number of different ways, the preferred method being a discrete point file map.

Thirdly, the overall geometry of the eye and eye lids are assessed in order to record the Horizontal Visual Iris Diameter (commonly referred to as the HVID) and the position of the top and bottom lid with respect to the iris, measured during normal straight line gaze.

Initially, the method of the present invention relates to determining the optical characteristics of the optical zone of a soft contact lens.

Figure 1:
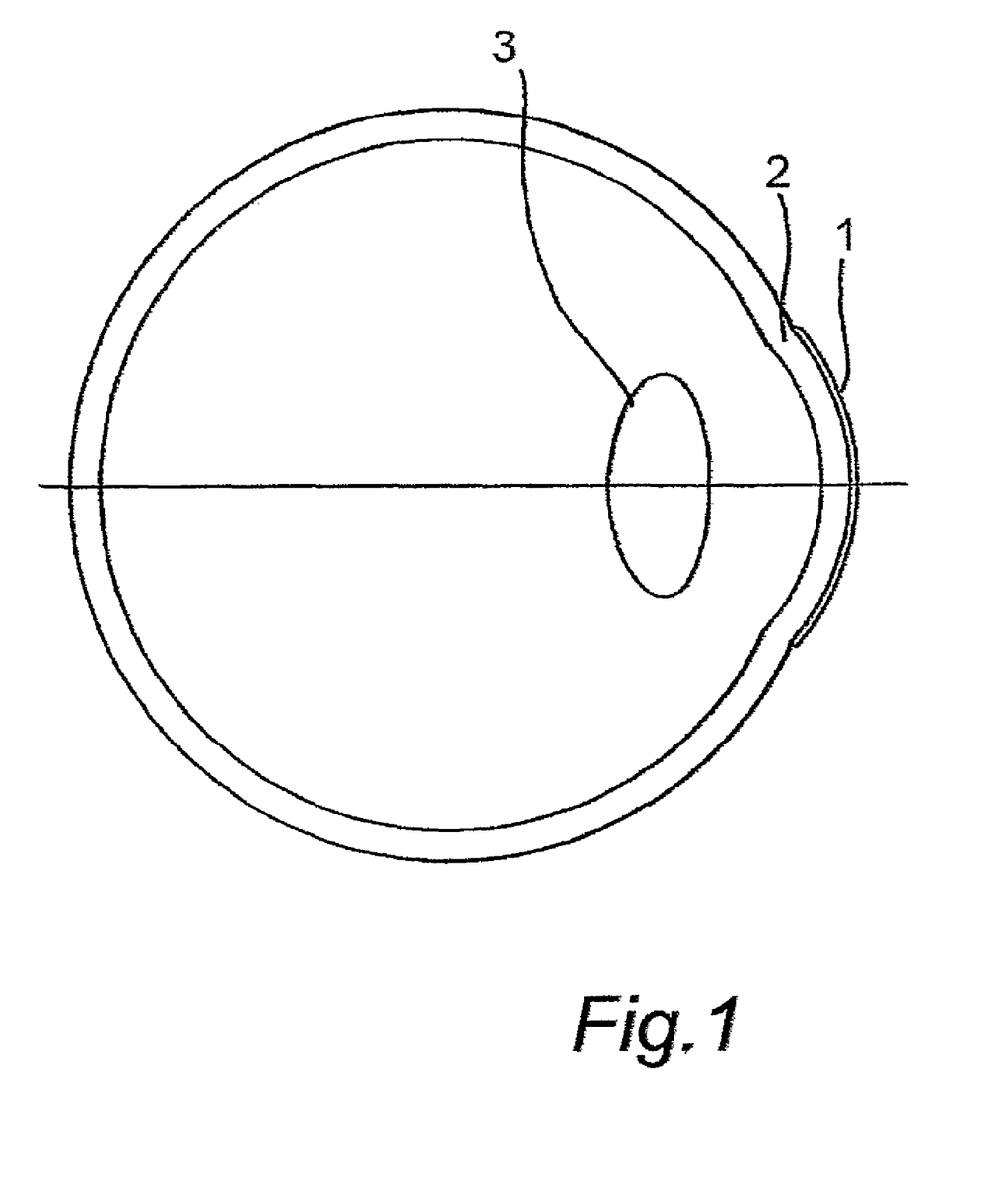
FIG. 1 is a schematic representation of a computer model of a selected eye including a soft contact lens. The model is generated using corneal topography information and aberration data.

A computer-generated model (illustrated schematically in FIG. 1) of a selected eye including a soft contact lens (1) is created using the measured wavefront geometry to represent the ocular performance, and the corneal topography to directly represent the computer model cornea (2). The posterior surface of the soft contact lens is defined as the topography of the computer model cornea with an offset allowance value relating to an arbitrary tear layer thickness, having a typical value of 11 μm, as determined from '*Measurement of Post-Lens Tear Thickness*', Lin M C, Graham A D, Polse K A, Mandell R B, McNamara N A (Morton D. Sarver Laboratory for Cornea and Contact Lens Research, School of Optometry, University of California, Berkeley Calif. 94720-2020 USA). The model also includes the crystalline lens (3).

The anterior surface of the soft contact lens is determined using, for example, a ray tracing technique (FIG. 2), wherein an initial point (4) is selected on the anterior surface of the lens (5), which is a desired distance from the posterior surface (6), corresponding to the thickness of the lens at that point. Preferably, but not necessarily, the selected initial point (4) may be on the optical axis (8) of the lens. In this instance, at the selected initial point, the anterior surface of the lens (5) will be perpendicular to the optical axis. A series of points along the wavefront (9) are then selected, each being an incremental distance (e.g. about 0.001 mm to 0.100 mm) along the wavefront (9) from the selected initial point (4) on the anterior surface (e.g. at increasing displacement from the optical axis 8). Incident light rays (10) passing through the selected series of points, the behaviour of which rays is determined by the previously measured wavefront (9), are then modelled, allowing for refraction through the lens, so as to determine the necessary shape of the anterior surface (5) to cause the emergent rays (11) to exit from the lens/eye system in a desired wavefront pattern (12), which will preferably be planar and perpendicular to the optical axis. The process is then reiterated for a plurality of radii or paths across the lens.

Figure 2:
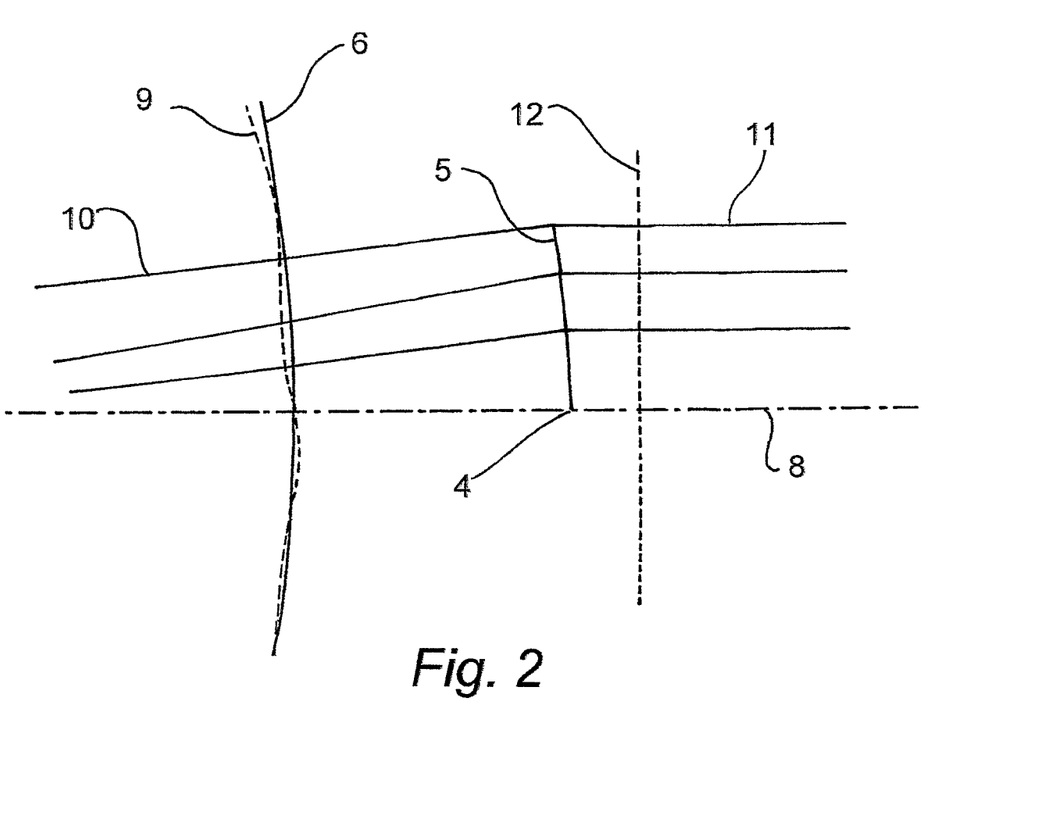
FIG. 2 is a schematic representation of a method of determining the required anterior surface of a soft contact lens across one section or path by positioning the wavefront, representing the aberration data, at the apex of the posterior surface of the soft contact lens and using ray tracing to create the anterior surface.

Once the anterior surface of the lens has been defined, it is necessary to ascertain the lens thickness (as determined by the applied anterior surface shape) at incremental points through each section or path of the soft contact lens representation. If the thickness of the contact lens falls below a minimum value, typically within the range of 0.04 mm to 0.15 mm, preferably having a minimum value of 0.07 mm depending on the soft material properties chosen (e.g. the physical robustness of the lens material), the process used to determine the anterior surface of the lens is reiterated, and the initial point is placed at a distance further away from the posterior surface of the lens, so as to increase the thickness of the lens so that, at its thinnest point, the lens does not fall below the minimum thickness.

Once the posterior and anterior surfaces of the lens have been defined in situ on the computer model, the soft contact lens representation is removed from the model eye and deformed in order that the posterior surface conforms to a desired surface (e.g. a standard soft contact lens fitting). This has the benefit of (i) producing a flatter surface to allow for the capillary forces between the contact lens and the eye; and (ii) producing a lens that is simpler to manufacture due to the ability to introduce the desired features into the anterior surface of the lens. In this preferred embodiment, the desired surface is a spherical surface that is between 0.20 mm and 0.50 mm (preferably about 0.35 mm) flatter in radius than the best fit spherical approximation to the corneal topography. A flatter fit (i.e. greater radius of curvature) is desired in order to avoid a suction effect between the cornea and a tightly fitting lens.

Figure 3:
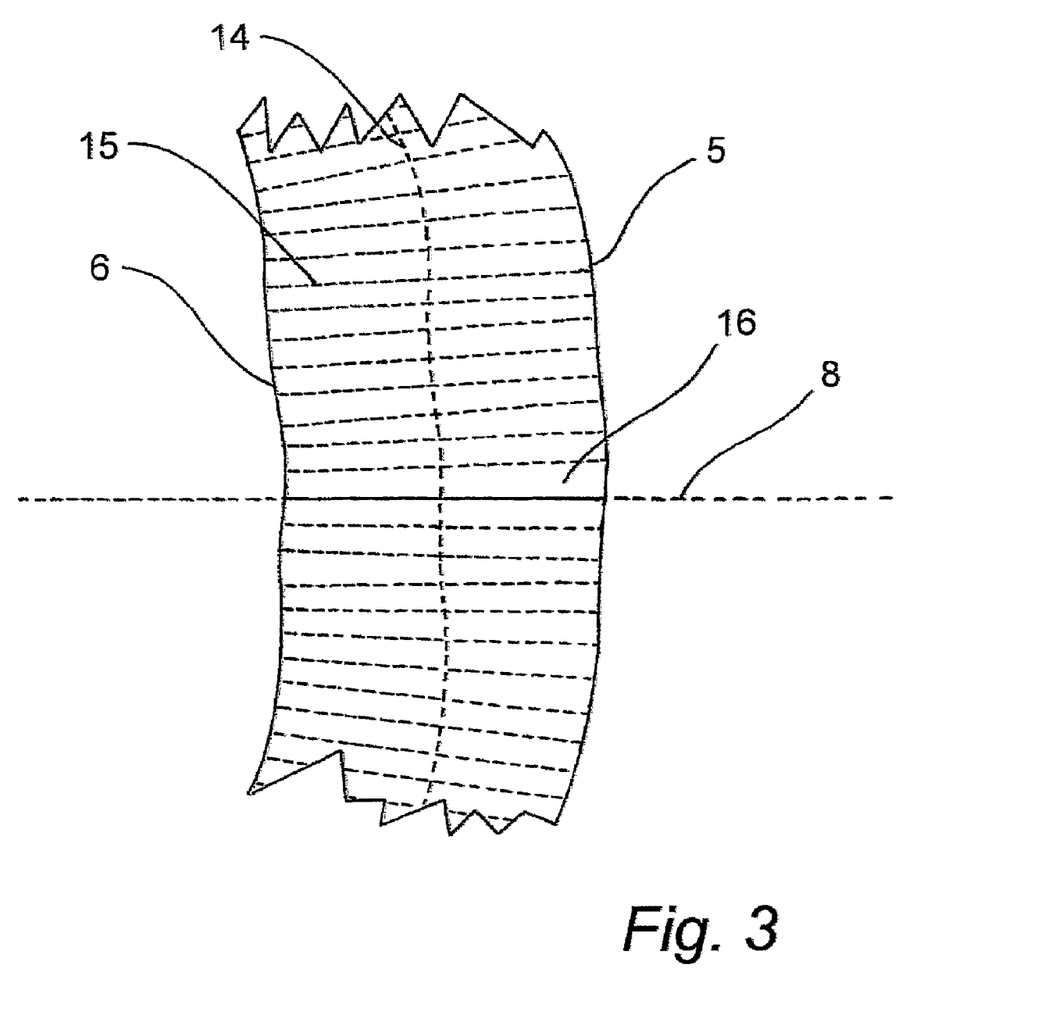
FIGS. 3 and 4 illustrate schematically a method used to adjust the anterior surface of a contact lens across one section or path by splitting the contact lens section into elements defined by a boundary perpendicular to the section centreline and moving each element by the required amount to achieve the desired posterior geometry.
Figure 4:
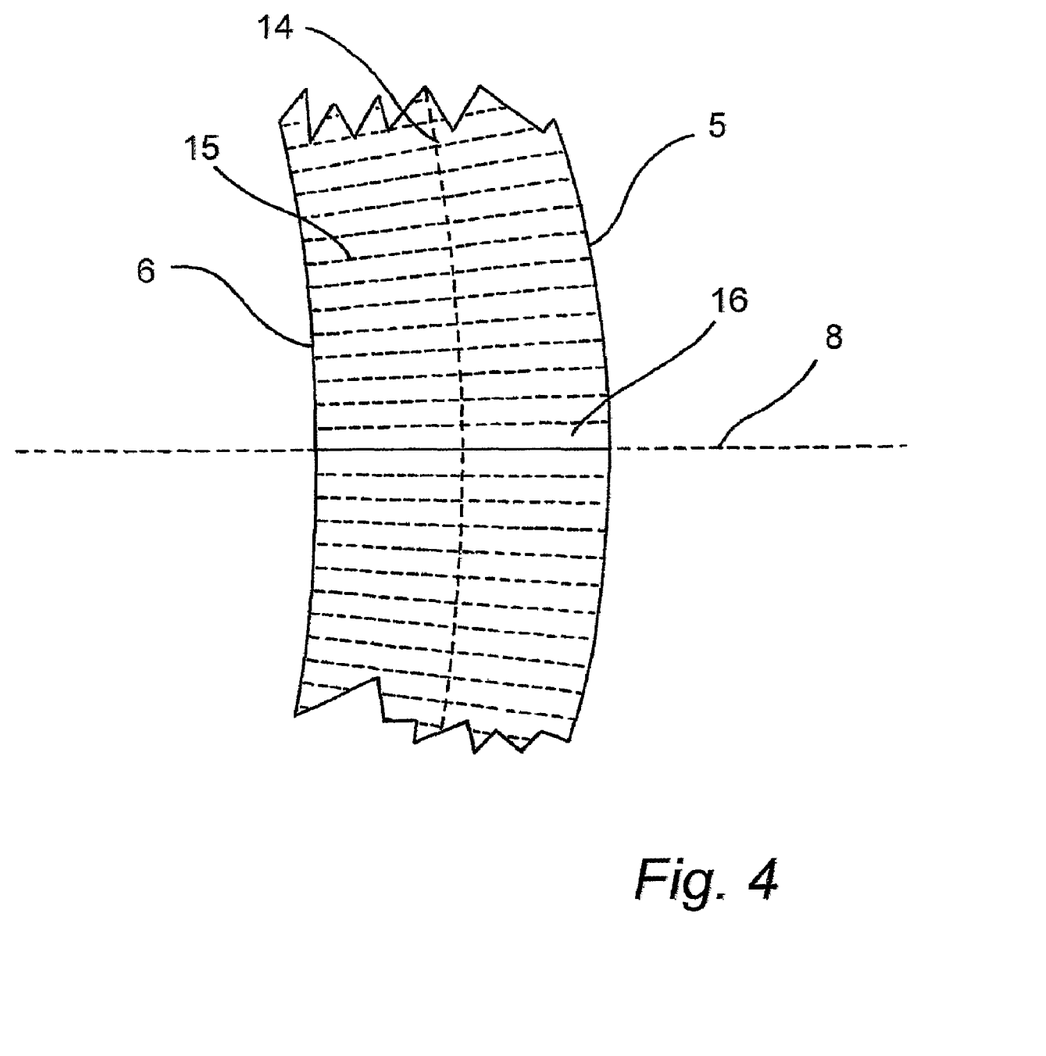

The anterior surface is adjusted across each section or path of the contact lens by splitting each lens section or path into a plurality of notional elements (16, FIG. 3). Typically, the separation of boundaries (15) of each element is between 0.001 mm and 0.100 mm (preferably 0.010 mm) in width. The element boundaries (15) are preferably defined as being perpendicular to the centreline (14) of the selected section or path. From an arbitrary start point, preferably at the optical axis of the soft contact lens, each element is moved in a direction perpendicular to the centreline (14) of the section or path, in order to achieve the desired posterior surface. Consequently, the anterior surface of the soft contact lens representation will be modified (FIG. 4). This process is repeated for each section or path of the soft lens representation. Typically between 24 and 384 sections or paths (preferably 384) are used for each complete lens to create a three dimensional anterior surface representation of the lens.

As the soft contact lens will experience translational and rotational deviations from the central optical axis of the eye, the performance of the lens is evaluated through an interactive process. The represented soft contact lens is positioned such that it is superposed on and arranged at incremental translational positions from the optical axis of, the computer model cornea (typically between 0.10 mm and 1.00 mm, preferably 0.5 m=along the positive and negative x- and y-axes (i.e. both above and below the optical axis and to each side thereof), and at incremental rotational positions from the horizontal axis perpendicular to the optical axis of the computer model (typically between 1 degree and 10 degrees, preferably 5 degrees, in both clockwise and counterclockwise directions).

The anterior surface is deformed in relation to the posterior surface, preferably by taking incremental elements (15) across the lens shown in FIG. 3. Each element (15) is moved in a direction perpendicular to the centreline (14) of the soft contact lens for each section or path of the lens in order to conform the posterior surface of the lens to the incrementally translated and/or rotated cornea topography of the computer model cornea, offset by an arbitrary tear layer thickness having typical diameter of 0.11 μm. The resulting lens is illustrated schematically in FIG. 4.

The total computer model aberrations are determined using mathematical techniques such as optical path lengths, ray tracing or other techniques. From the total computer model eye/lens system aberrations, the performance of the represented soft lens may be reviewed using techniques known to those skilled in the art such as review of optical transfer functions, point spread functions and representative retinal images. The results from the optical analysis will determine whether the optical performance of represented soft contact lens is satisfactory. Preferably, the lens will attain between 6/3 and 6/6 visual acuity (preferably at least 6/4 visual acuity). The results will also determine the choice of stabilisation means in order to minimise the level of translational or rotational effects.

In a preferred embodiment, peripheral areas are provided for both the posterior and anterior surfaces of the soft lens using techniques that are known to those skilled in the art. The peripheral areas may be configured to incorporate regions that stabilise the lens both rotationally and translationally. Preferably, stabilisation wedges are configured onto the anterior peripheral area of the soft contact lens to provide rotational stability.

In order to manufacture the soft contact lens, it is necessary to configure the design to allow for polish-free manufacture. In this preferred embodiment, Bezier cubic spline curves are used to smooth the zonal junctions between the optical areas of the lens. This technique is used to smooth the junctions of the anterior and posterior surfaces of the soft contact lens, the peripheral areas of the lens and the zonal junctions created by use of stabilising configurations.

The soft contact lens configuration is then transposed from the hydrated state to the dry dehydrated state through the use of a bulk transformation factor that relates to the material properties of the lens. In addition, manufacturing processes such as cast mould shrinkage are compensated for. Once the design of the lens has been determined, a three-dimensional data set is created and contact lens production equipment (preferably state-of-the-art lathing systems such as the Precitech Optoform 80 with FTS1000 oscillating tool technology) is used to manufacture the soft contact lens directly either in its entirety or as part of a hybrid process where the posterior of the lens is moulded and the anterior of the lens is machined.

EXAMPLE 2

A computer generated model may be generated in accordance with the present invention using information obtained from a sample population.

The ocular performance of several eyes from a sample population, typically of between 50 to 1000 people (preferably about 500 people) are measured using a wavefront aberrometer such as the Topcon KR-9000PW Wavefront analyser. The data is preferably represented using a set Zernike coefficients relating to Zernike polynomial descriptions of wavefront geometrical forms. The Zernike coefficients are represented in a distributive form in order to determine statistical similarities between the population data. Significant similarities are then determined and used to create a collective set of Zernike coefficients.

The soft contact lens design is then determined using the method described in Example 1. Large-scale production techniques such as cast moulding may be used in the manufacture of the soft contact lens, wherein the insert tool for cast mould manufacture is prepared preferably by state-of-the-art lathing systems such as the Precitech Optoform 80 with FTS1000 oscillating tool technology.

The invention claimed is:

1. A method of designing a soft contact lens, the method comprising the steps of:
   (a) measuring or defining a wavefront generated by passage of light through a selected eye and using the wavefront to generate a computer model of the optical characteristics of the selected eye;
   (b) measuring or defining the topography of the cornea of the selected eye;
   (c) incorporating into the computer model a soft contact lens, the posterior surface topography of which is defined by the topography of the cornea, offset by an arbitrary amount intended to represent the tear layer thickness of the selected eye, said lens having a defined thickness at a selected locus on the anterior surface;
   (d) calculating a desired topography for the anterior surface of the lens such that the wavefront will be corrected to assume a desired pattern when passing through the computer model eye/lens combination;
   (e) remodeling the lens in isolation from the eye by adapting the posterior topography of the lens to a desired posterior topography to be manufactured; and
   (f) recalculating a modified anterior topography for the lens required as a result of adapting the posterior topography, the modified anterior topography being intended to preserve the desired wavefront pattern defined in (d) when the lens is in situ on the selected eye;
wherein steps (e) and (f) are performed substantially simultaneously by dividing the lens into a plurality of notional elements, each element being moved towards or away from the posterior surface as appropriate so as to arrive at the desired posterior topography and simultaneously modifying the anterior surface topography.

2. A method according to claim 1, wherein the lens is made according to a given posterior surface topography and to the calculated anterior surface topography.

3. A method according to claim 1, wherein the peripheral area of the posterior and/or anterior surface of the contact lens comprises one or more features configured to confer rotational stability on the lens.

4. A method according to claim 1, wherein the peripheral area of the posterior or anterior surface of the contact lens comprises one or more features configured to confer translational stability on the lens.

5. A method according to claim 1, wherein the contact lens posterior surface topography comprises one or more features configured to confer rotational stability on the lens.

6. A method according to claim 1 wherein the contact lens posterior surface topography comprises one or more features configured to confer translational stability on the lens.

7. A method according to claim 1, wherein the junctions between the different zones of the lens surfaces are smoothed using geometrical techniques such as fillet radii, quadratic spline curves, cubic spine curves or other techniques designed to reduce the sharpness of the zonal junctions and allow for polish-free manufacture.

8. A method according to claim 1, wherein the optical performance of the lens is calculated at incremental translational and rotational offsets from the optical axis of the computer model and used to determine the efficacy of the soft lens design and the stabilization means used.

9. A method according to claim 1, wherein the generated wavefront and/or the corneal topography is based on data obtained from a plurality of subjects.

10. A method according to claim 1, wherein the wavefront is defined using Zernike or Seidal aberration coefficients.

11. A method of making a lens wherein the posterior and anterior topography of the lens are designed according to a method of claim 1.

12. A soft contact lens made by the method of claim 11.

13. A method according to claim 1, in which said desired pattern is planar, the plant of which is perpendicular to the optical axis of the lens.

* * * * *